July 9, 1968  J. J. GLOWINSKI ET AL  3,392,325

PRECISION AC TRANSDUCER WITH TAP-CHANGING AUTOTRANSFORMER

Filed April 13, 1966  2 Sheets-Sheet 1

Fig. 1.

INVENTORS.
John Glowinski
John Viggiano
BY
*[signature]*
ATTORNEY.

July 9, 1968     J. J. GLOWINSKI ET AL     3,392,325
PRECISION AC TRANSDUCER WITH TAP-CHANGING AUTOTRANSFORMER
Filed April 13, 1966     2 Sheets-Sheet 2
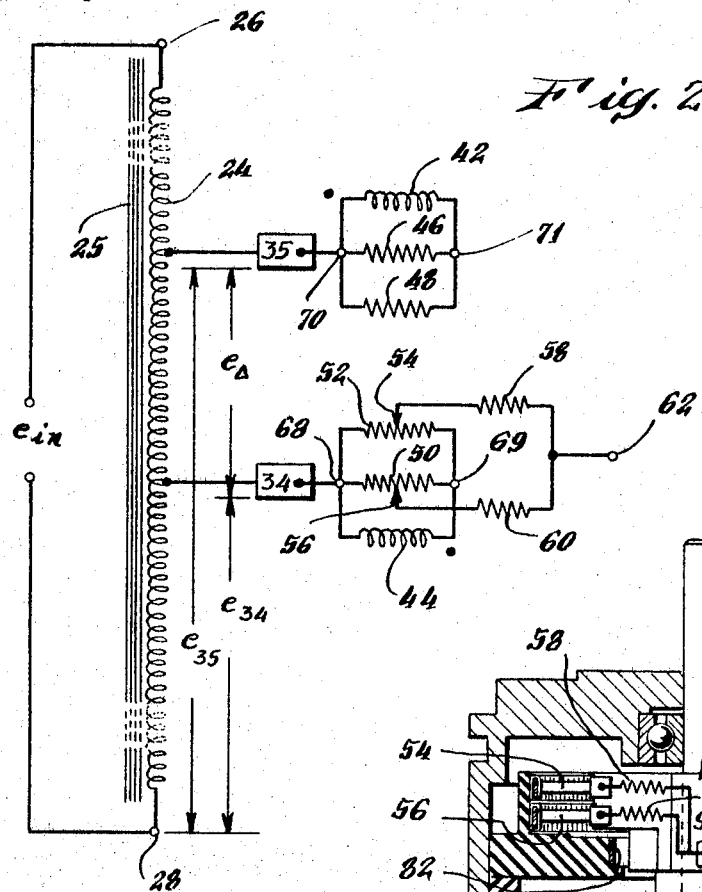
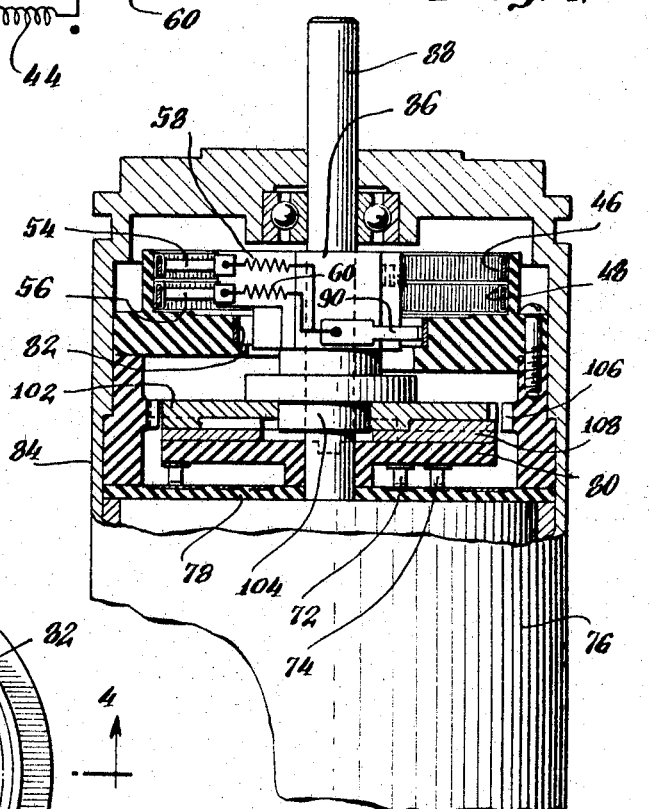
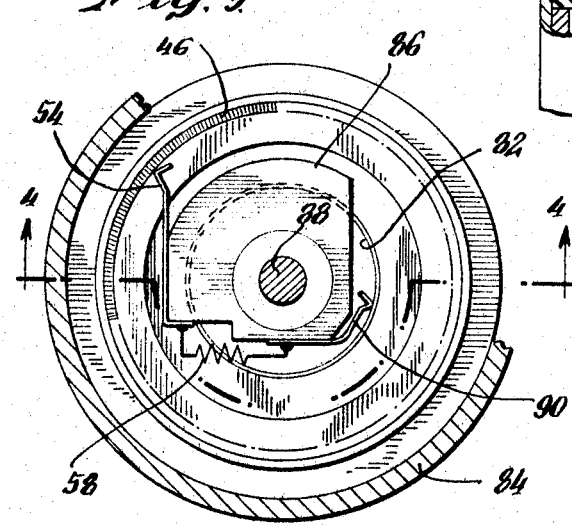
INVENTORS,
John Glowinski
John Viggiano
BY
Frank J. Thompson
ATTORNEY.

United States Patent Office 3,392,325
Patented July 9, 1968

3,392,325
PRECISION AC TRANSDUCER WITH TAP-CHANGING AUTOTRANSFORMER
John J. Glowinski, Ridgefield, and John D. Viggiano, Shelton, Conn., assignors to The Perkin-Elmer Corporation, Norwalk, Conn., a corporation of New York
Filed Apr. 13, 1966, Ser. No. 542,392
7 Claims. (Cl. 323—43.5)

This invention relates to a precision transducer for use in electrical apparatus. The invention is related more particularly to an autotransformer type of precision AC transducer.

A known form of precision AC transducer comprises an autotransformer having a carefully fabricated winding and a plurality of winding taps accurately located thereon. An input signal is applied between input and reference terminals of the device and accurate increments of the input signal appear between the winding taps. The transducer also includes a shaft-driven switching and interpolating means for deriving an output signal having an amplitude corresponding to the signal amplitude either at a particular tap on the winding or at positions on the transformer winding which lie intermediate the taps. Precision transducers of this type are described and claimed in U.S. Patents 2,843,822 and 3,027,510 which are assigned to the assignee of the present invention.

In one arrangement, the interpolating means includes an accurately wound wire resistance and a wiper contact which is coupled to a signal output terminal. In operation, the interpolating means is switched to successively positioned transformer winding taps in timed relationship with the movement of the resistance wiper contact. The amplitude of the output signal is thereby continuously variable and accurately related to the input signal by the drive shaft position.

A.C. transducers of this type are noted for a relatively high degree of conformity to a desired input-output signal relationship. In certain applications of the transducer, the conformity requirements are demanding and an unusually high degree of care is therefore required in selecting and assembling components for the transducer. The production yield of transducers even under these conditions is relatively low and results in a relatively high production unit cost.

It is an object of the present invention to provide an improved transducer of the type described.

Another object of the present invention is to provide a transducer having a relatively high degree of conformity to a desired input-output signal relationship.

The autotransformer winding and associated windings are fabricated of relatively large gauge wire and exhibit a relatively low resistance whereas the interpolating resistance winding is formed of relatively smaller gauge wire and exhibits a relatively larger resistance. Variations which occur in the physical arrangement of the resistance winding, during fabrication as well as variations in the resistance of the wire along its length contribute undesirably to a limitation in the conformity attainable.

It is another object of the present invention to provide a transducer having an interpolating resistance arrangement which provides improved conformity.

A further object of the invention is to provide a transducer having a high conformance interpolating means and which is relatively compact in arrangement.

In accordance with the present invention, an AC transducer comprises an autotransformer having a transformer winding including taps positioned thereon and an interpolating means having two parallel coupled resistive windings and associated wiper contacts. Means are provided for switching the interpolating means to progressive transformer winding taps in timed relationship with concurrent movement of the wiper contacts. The wiper contacts are coupled to a signal combining network and an output signal is derived therefrom. By this arrangement, deviations in the resistance of the interpolating resistance windings are reduced and a relatively high degree of conformity is thereby attainable.

These and other objects and features of the invention will become apparent with reference to the specifications and drawings wherein FIGURE 1 is a schematic drawing illustrating the precision A.C. transducer of the present invention;

FIGURE 2 is a simplified schematic diagram illustrating a portion of the circuit of FIGURE 1;

FIGURE 3 is a plan view of the transducer of the present invention; and

FIGURE 4 is a partly cutaway elevation view having a section taken along 4—4 of FIGURE 3 and illustrating the resistor and contact arrangement of the AC transducer.

Referring now to FIGURE 1, an autotransformer generally represented as 20 includes a winding 24 which is wound about a core 25 of ferromagnetic material. The transformer is energized by an input signal, $e_{in}$, derived from a source (not shown) and applied between an input terminal 26 and a reference terminal 28. A plurality of transformer winding taps are connected to commutator segments indicated symbolically by the rectangles numbered 30 through 41 and increments of the input signal amplitude appear between these taps.

Interpolating means for interpolating an increment of signal voltage include two inductive elements 42 and 44 disposed in magnetic flux linkage relationship with the autotransformer winding 24. These inductive elements 42 and 44 are generally wound on the core 25 and include sufficient turns for inducing a voltage increment approximately equal to one half of the input voltage divided by the number of shaft revolutions for full scale. An interpolating resistance 46, an interpolating resistance 48, and the inductance 42 are coupled in parallel. Similarly, an interpolating resistance 50, an interpolating resistance 52 and the inductance 44 are coupled in parallel. Each of the interpolating resistances 46, 48, 50 and 52 comprises an elongated wire wound resistance. Wiper contacts 54 and 56 provide for electrical connection to the interpolating resistances along their lengths. The wiper contacts are coupled to a signal combining network comprising resistors 58 and 60 which provide a resultant output signal at an output terminal 62.

Switching means are provided for progressively coupling the interpolating means to successive taps on the transformer winding 24. The switching means includes the aforementioned commutator segments 30 through 41 and slip rings for providing a sliding contact surface. In FIGURE 1, the slip rings are represented by the elongated rectangles 64 and 66. One terminal 68 of the parallel coupled inductor 44 and resistors 50 and 52 is coupled to the slip ring 64. Similarly, one terminal 70 of the parallel coupled inductor 42 and resistances 46 and 48 is coupled to the slip ring 66. Sliding contacts 72 and 74 interconnect the slip rings with the commutator segments.

A mechanical drive means causes movement of the contacts 72 and 74 in timed relation with the concurrent operation of the wiper contacts 54 and 56. In one arrangement, a shaft-driven drive means is adapted for moving the slider contacts 72 and 74 progressively to a successive commutator segment during one shaft revolution and for causing a 360° rotation of the wiper contacts 54 and 56 during one shaft rotation. An arrangement of this form provides a direct drive for the wiper contacts 54 and 56 and a speed reduced drive for the slider contacts 72 and 74. One such drive arrangement is described and claimed in U.S. Patent No. 3,127,382 which is assigned to the assignee of the present invention.

The operation of the AC transducer may be explained with reference to the simplified partial schematic diagram of FIG. 2. The input signal, $e_{in}$, applied between terminals 26 and 28 of the transducer will establish an AC potential, $e_{34}$, between the tap coupled to the commutator segment 34 and the terminal 28. An AC potential, $e_{35}$, will also be established between the tap coupled to the commutator segment 35 and the terminal 28. The potential $e_{35}$ will differ in amplitude from the potential $e_{34}$ by some increment of voltage $e_\Delta$, the amplitude of which depends on a particular arrangement of the transformer winding and the taps.

The interpolating means is provided in order to establish an output voltage at terminal 62 which has a value intermediate the amplitudes $e_{34}$ and $e_{35}$. Inductance windings 42 and 44 are generally wound with a sufficient number of turns in order to provide an induced voltage across each of these inductances having a magnitude approximately equal to $e_\Delta/2$. Thus, the A.C. voltages established between terminals 68 and 69 of the inductor 44 and terminals 70 and 71 of the inductance 42 have a magnitude substantially equal to $e_\Delta/2$. Since the inductance 44 is shown in FIG. 2 to be conductively coupled to the commutator segment 34 and is polarized in phase with the transformer winding 24, the A.C. voltage measured between junction 69 and terminal 28 is equal to $(e_{34}+e_\Delta/2)$. Adjustment of the wiper contacts by the aforementioned switching means during one half of a revolution of a rotary drive shaft provides for interpolating the increment of the voltage $e_\Delta/2$ and provides as an output signal a voltage within the amplitude range of $e_{34}$ to $(e_{34}+e_\Delta/2)$. Similarly, since the inductance 42 is shown to be conductively coupled to the commutator segment 35 and is polarized out of phase with the transformer winding 24, the A.C. voltage established between junction 71 and the reference terminal 28 is $(e_{35}-e_\Delta/2)$. The wiper contacts 54 and 56 will contact resistances 46 and 48 (not shown) during a second half of the revolution of the rotary drive shaft, provide for interpolating the increment of voltage, and provide an output signal having a voltage within the range of $(e_{35}-e_\Delta/2)$ to $e_{35}$. In prior arrangements, a resistance 46, a resistance 50, and a contact 54 are provided along with the inductances 42 and 44 for interpolating incremental voltages. As indicated previously, manufacturing variations in the resistance windings undesirably limits the conformance obtainable with such arrangements.

In accordance with a feature of the present invention, the effect of resistance variations which occur along the length of the resistance 46 are reduced by the parallel coupled resistance 48 and similarly resistance variations which occur along the length of the interpolating resistance 50 are reduced by the parallel coupled resistance 52. A shunt path is now provided for the interpolating current and differences occurring in the amplitude of these currents as a result of variations in the interpolating resistances are averaged by the resistive network formed by the resistors 58 and 60. Thus, for example, when a relatively high resistive point is contacted on resistance 46, for example, the value of this resistance is averaged with that of the corresponding resistance on 48. In the case where both resistances 46 and 48 exhibit unusually disproportionate resistances extending in the same direction, i.e., both higher or lower, then a one of these resistances can simply be rotated during the quality control portion of the fabrication.

A relatively compact arrangement of the interpolating means for an A.C. transducer of the present invention is illustrated in FIGS. 3 and 4. Although not illustrated in detail, a lower casing 76 (FIG. 4) includes a transformer winding 24 wound about a toroid core 25 (not shown). The inductance 42 and the inductance 44 are also wound about the core and leads extending from the windings and the transformer windings are connected to associated commutator segments and slip rings positioned on an upper surface of contact disc 78. Conductive slip rings and commutator segments are formed on the disc 78 by conventional printed circuit techniques. A slide contact rotor 80 supports the slide contacts 72 and 74 in relation to the contact disc 78.

In accordance with another feature of the invention, the interpolating resistances 46, 48, 50 and 52 and an output slip ring 82 are supported by an electrically insulative support element 84. The resistances 46 and 52 may comprise a toriodally formed winding having two electrically isolated 180° sections. The resistances 48 and 50 may similarly comprise a toroidally formed winding having 180° sections electrically isolated. These toroids along with an annular output wiper ring 82 are concentrically supported by the element 84.

A wiper contact rotor 86 is mechanically coupled to and driven by a rotably mounted shaft 88. Wiper contacts 56 and 54 and an output wiper contact 90 are supported by the rotor in contacting relationship with the upper and lower resistances and the output control ring 82 respectively.

A speed reducing mechanism for providing movement of the contacts 72 and 74 to progressively succeeding segments during one complete revolution of the shaft 88 includes a spur gear 102 which is coupled to and driven by the shaft 88 via an eccentric 104. A corresponding inside gear 106 is provided as an integral portion of the support element 84. An annular coupling ring 108 intercouples the gear 102 and the contact disc 80. Since rotation of the gear 82 is not concentric about the axis of the shaft 88, the ring 108 is provided for translating the eccentric motion of the gear 82 to circular motion of the disc 80. This speed reducing mechanism is described in greater detail in U.S. Patent 3,129,382 which is assigned to the assignee of the present invention.

The interpolating means of the A.C. transducer described herein provides a relatively high degree of conformity to a desired input-output signal relationship. In addition, the arrangement described produces a relatively compact transducer having two resistive toroids and an output control ring.

Various other arrangements embodying features of the invention described herein may occur to those skilled in the art. For example, it may be desired in certain instances to modify the switching arrangement illustrated, to eliminate the inductances 42 and 44, and to couple the parallel coupled interpolating resistances in shunt with successive commutator segments.

While we have illustrated and described a particular embodiment of our invention, it will be understood that various modifications may be made therein without departing from the spirit of the invention or the scope of the appended claims.

We claim:

1. An A.C. transducer comprising:
   an autotransformer having a winding and means including input and reference terminals thereof for applying an input signal voltage to the winding,
   said winding having a plurality of taps for providing increments of the input signal voltage therebetween,
   an output signal terminal for said transducer,
   an interpolating means for deriving from said winding a signal having an amplitude less than an increment of signal voltage between the taps,
   switching means for progressively coupling said interpolating means to successive taps on said winding, and
   said interpolating means including first and second elongated parallel coupled resistances, first and second wiper contacts adapted for respectively contacting said first and second resistances at intermediate positions along the length of the resistances, and means coupling said wiper contacts to said output terminal.

2. The transducer of claim 1 wherein said means for coupling said first and second wiper contacts to said output terminal includes a signal combining network for combining the signal voltages appearing at each of said wiper contacts and for applying a resultant signal to said output terminal.

3. An A.C. transducer comprising:
an autotransformer having a winding and means including input and reference terminals thereof for applying an input signal voltage to the winding,
said winding having a plurality of taps for providing increments of the input signal voltage therebetween,
first and second inductance elements,
an output signal terminal for said transducer,
first and second elongated resistances coupled in parallel wtih said first inductance and third and fourth elongated resistances coupled in parallel with said second inductance,
first and second wiper contacts adapted for concurrently contacting said first and second resistances respectively and for concurrently contacting said third and fourth resistances,
switching means adapted for conductively coupling said first and said second inductances progressively to successive taps on said winding in timed relationship with movement of said wiper contacts, and
a signal combining network for coupling said first and said second wiper contacts to said output terminal.

4. The transducer of claim 3 wherein said first, second, third and fourth resistances comprise wire wound resistances.

5. The transducer of claim 3 wherein said signal combining network comprises a resistive network.

6. The transducer of claim 5 wherein said signal combining network comprises a first resistor coupled to said first contact, a second resistor coupled to said second contact, and means coupling each of said resistors to said output terminal.

7. In an A.C. transducer having a transformer core, a transformer winding positioned about said core and a plurality of taps positioned along said winding, an interpolating means for interpolating increments of voltage occurring between said taps and including a first and a second parallel coupled resistance and a third and a fourth parallel coupled resistance, and an output slip ring for coupling the interpolating means to an output terminal of the transducer, a means for supporting said resistances and output slip ring comprising an annular support member formed of electrically insulative material and having collar and shoulder portions thereof, said first and third resistances and said second and fourth resistances comprising first and second wire wound toroids having resistance taps positioned along and electrically designating portions of the winding, said first and second toroids positioned at axially displaced portions on said support shoulder and said output slip ring supported at said collar.

References Cited

UNITED STATES PATENTS

| 2,774,934 | 12/1956 | Gitzendanner | 323—43.5 |
| 2,843,822 | 7/1958 | Scott | 323—43.5 |
| 3,027,510 | 3/1962 | Scott | 323—45 |
| 3,343,071 | 9/1967 | Keats | 323—43.5 |

JOHN F. COUCH, *Primary Examiner.*

W. E. RAY, *Examiner.*